US010161822B1

(12) United States Patent
Rollins

(10) Patent No.: US 10,161,822 B1
(45) Date of Patent: Dec. 25, 2018

(54) DIFFERENTIAL PRESSURE MEASUREMENT SYSTEM WITH SOLENOID COUPLED REFERENCE RESERVOIR

(71) Applicant: Joshua B. Rollins, Austin, TX (US)

(72) Inventor: Joshua B. Rollins, Austin, TX (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 164 days.

(21) Appl. No.: 15/066,250

(22) Filed: Mar. 10, 2016

(51) Int. Cl.
*G01L 13/02* (2006.01)
*E21B 34/08* (2006.01)

(52) U.S. Cl.
CPC .......... *G01L 13/025* (2013.01); *E21B 34/08* (2013.01)

(58) Field of Classification Search
None
See application file for complete search history.

(56) References Cited

U.S. PATENT DOCUMENTS

| 4,738,276 A * | 4/1988 | Adams | F16K 11/20 137/343 |
| 5,610,323 A * | 3/1997 | Ashworth | G01M 3/2815 73/40.5 R |
| 5,988,203 A * | 11/1999 | Hutton | G01F 1/36 137/271 |
| 6,742,537 B2 * | 6/2004 | Martus | F02M 25/0836 123/520 |
| 6,823,289 B2 * | 11/2004 | Kasuya | F04B 23/06 702/185 |
| 7,231,831 B1 * | 6/2007 | Lancaster | G01L 19/0015 137/15.09 |
| 2016/0281460 A1 * | 9/2016 | Wang | E21B 41/0007 |

* cited by examiner

*Primary Examiner* — Lisa Caputo
*Assistant Examiner* — Nathaniel T Woodward
(74) *Attorney, Agent, or Firm* — Howard Kaiser

(57) ABSTRACT

An embodiment of an inventive method for measuring pressure provides for a reference environment and an ambient environment. The reference environment is internal to a receptacle and has a reference fluid pressure. The ambient environment is external to the receptacle and has an ambient fluid pressure. Equalization of the reference pressure and the ambient pressure with respect to each other is effected by enabling and disenabling fluidic passage between the reference environment and the ambient environment. The fluidic passage is enabled until the reference pressure and the ambient pressure are equal, and is then disenabled to stabilize the equalized reference pressure. After the reference pressure and the ambient pressure are equalized, a differential pressure is measured between the equalized reference pressure and the ambient pressure. Inventive pressure measurements may be conducted, for example, repeatedly in association with a moving underwater model at various water depths and vehicular speeds.

16 Claims, 4 Drawing Sheets

DIFFERENTIAL PRESSURE MEASUREMENT SYSTEM WITH SOLENOID COUPLED REFERENCE RESERVOIR

BACKGROUND OF THE INVENTION

The present invention relates to measurement of fluid pressure, more particularly to fluid pressure measurement involving high variations in fluid pressure, such as characterizing fluid pressure on an underwater vehicle moving through a great range of water depths.

It is often desirable to take measurements of changes in pressure when conducting model testing of marine vehicles. For instance, one or more pressure gauges may be needed to measure changes in fluid pressure on the surface of a moving underwater model of an underwater vehicle. The subject model may be made to be representative of any of a variety of underwater vehicular types, whether large or small, manned or unmanned, fully autonomous or semi-autonomous or remotely operated.

A typical key requirement for measuring fluid pressure changes on underwater model surfaces is the capability of measuring such changes accurately within an extensive range of water depths. For instance, an investigator may seek to compare, at depth, the pressure on the surface of the model at test speed to the nominal pressure of the surrounding water environment. In these types of model testing, the depths required by the model may create a pressure differential that is orders of magnitude above the desired range of measurement.

Known methodologies for measuring pressure changes on underwater models at great depths are complicated, cumbersome, and expensive. For example, a conventional approach to performing differential pressure measurement involves attachment of a hose to the reference side of each of numerous gauges. All of the hoses are run to either a singular reference tank, or to the top side of the underwater model. According to this conventional practice, every hose must be checked for leaks and bubbles. As the number of gauges increases, so does the complexity of running, checking, and testing of all of the hoses. Accordingly, model testing contemplated for a particular model may require far too many gauges for such a system to be feasible.

SUMMARY OF THE INVENTION

In view of the foregoing, an object of the present invention is to provide an improved methodology for conducting deep underwater measurements of pressure changes on underwater models.

The present invention represents a new methodology for measuring fluid pressure changes on underwater models when situated in deep water. Exemplary practice of the present invention features equalization of the reference fluid pressure of a pressure gauge to the ambient fluid pressure at any depth. Exemplary inventive practice further features isolation of the reference side of the gauge from the ambient environment, once the respective fluid pressures are equalized, in order to maintain a steady, nominal reference fluid pressure during testing.

Exemplary inventive practice provides for a small reservoir inside an enclosure. The reservoir is used as the reference side of a differential pressure gauge. A solenoid valve is connected to the opposite end of the reservoir. Opening the solenoid for a suitable period of time allows the reservoir pressure to equalize with the ambient pressure. Closing the solenoid isolates the now equalized reference reservoir from any pressure fluctuations from the environment. The reservoir constitutes the reference volume, and the ambient environment that is separated from the reference volume when the solenoid is closed.

The present invention was motivated in part by the Navy's plans to conduct testing to measure changes in pressure on the surface of an underwater moving model. A conventional method for differential pressure measurement is to attach a hose to the reference side of each gauge, and to run all of the hoses to either a singular reference tank or to the top side of the model. Each of the hoses needs to be checked for leaks and bubbles. As the number of gauges needed increases, so does the complexity of running, checking, and testing of all of the hoses. The Navy's proposed model testing would have upwards of 75 gauges, far too many for this conventional system to be feasible.

No commercially available device would suitably fulfill these requirements. While it was possible to find differential pressure gauges that measured the region of interest, they were either far too large for the available space, or were not able to properly maintain a constant reference pressure while testing at depth in water. The inventive prototype succeeding in measuring the desired pressure region, maintaining a stable reference pressure at depth, and fitting into the prescribe volume.

The depths required by the model would create a pressure differential that would be orders of magnitude above the desired range of measurement. Traditional pressure measurement methodologies were deemed prohibitively complicated and expensive. Based on computational fluid dynamics simulations, the Navy sought to measure a range of ±0.14 psi within at least 1% accuracy. Furthermore, based on the design and layout of the model and testing equipment, the Navy sought to implement a pressure measurement package that fit within a volume of 2 in×1.5 in×4 in.

The inventive prototype satisfied these criteria and successfully compared the fluid pressure on the surface of an underwater moving model at test speed to the nominal fluid pressure of the surrounding underwater environment at depth. Exemplary inventive practice features equalization of a reference pressure of a gauge to the ambient pressure at any depth. Exemplary inventive practice further features isolation of the reference side of the gauge from the ambient environment once equalized, thereby maintaining a steady, nominal reference pressure during testing.

Although the present invention's differential pressure measurement system was initially envisioned for specific kinds of testing, inventive practice is possible for a variety of applications. For instance, pressure measurement in cavitation tunnels can be difficult due to high variations in pressure, and inventive practice can be propitious in such an environment. The inventive system can also be used in ocean-going ship tests and in wind tunnel tests. Any testing involving measurement of small variations in pressure while being confronted with large pressure gradients in the surrounding environment will benefit greatly by implementing the inventive system.

BRIEF DESCRIPTION OF THE DRAWINGS

The present invention will now be described, by way of example, with reference to the accompanying figures, wherein.

DESCRIPTION OF EXEMPLARY EMBODIMENTS OF THE INVENTION

Figure 1:
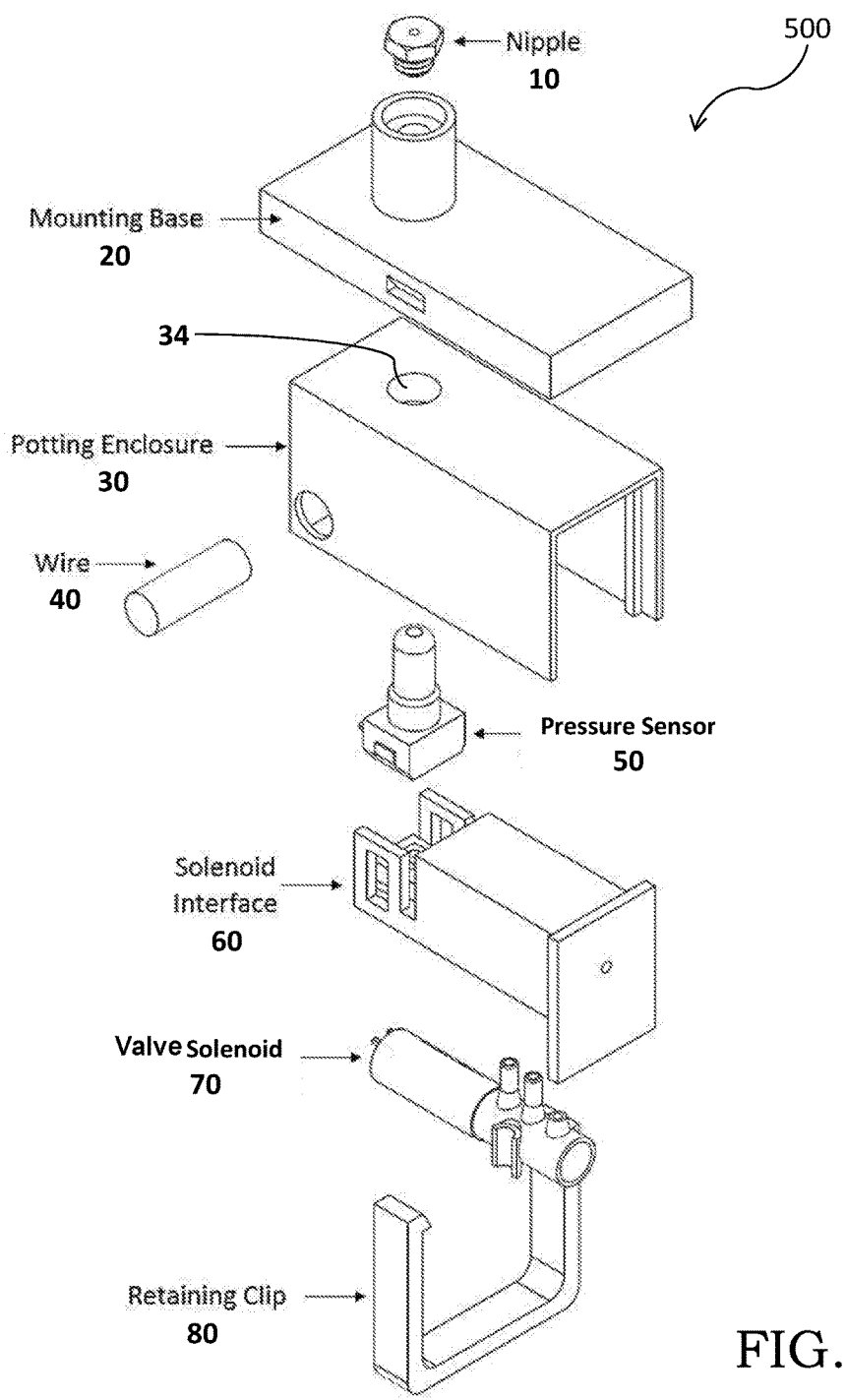
FIG. 1 is an exploded view of an example of a differential pressure measurement device in accordance with the present invention.

An inventive prototype that was made and tested by the United States Navy is depicted in the drawings. Referring to FIG. 1, inventive differential pressure measurement device 100 includes a nipple 10, a mounting base 20, a potting enclosure 30, electrical wiring (e.g., cable or metal wire) 40, a pressure sensor 50, a solenoid interface 60, a solenoid valve 70, and a retaining clip 80.

Nipple 10 projects outward from inventive device 100 into the ambient environment 200. According to the inventive prototype, nipple 10 was an off-the-shelf product such as commonly used for tubing and plumbing applications. The bottom of nipple 10 screws into the mounting base 20, thereby permitting nipple 10 to be removed or replaced if necessary. Nipple 10 provides a replaceable surface with respect to which pressure is measured. A very small central hole in nipple 10 allows for precise measurement of ambient pressure in very specific locations.

Mounting base 20 is joined (e.g., glued or bonded) permanently with or in the underwater vessel model (or other apparatus) to be tested. The cylindrical portion of mounting base 20 projects through a larger hole in the hull of the model, and enables the inventive practitioner to measure pressure at the surface of the model while keeping the majority of the inventive device 100 inside of the model. Retaining clip 80 is used in conjunction with mounting base 20 to secure the assembly (potting enclosure 30, wiring 40, pressure sensor 50, solenoid interface 60, and solenoid 70) in the desired location in association with the model.

Figure 2:
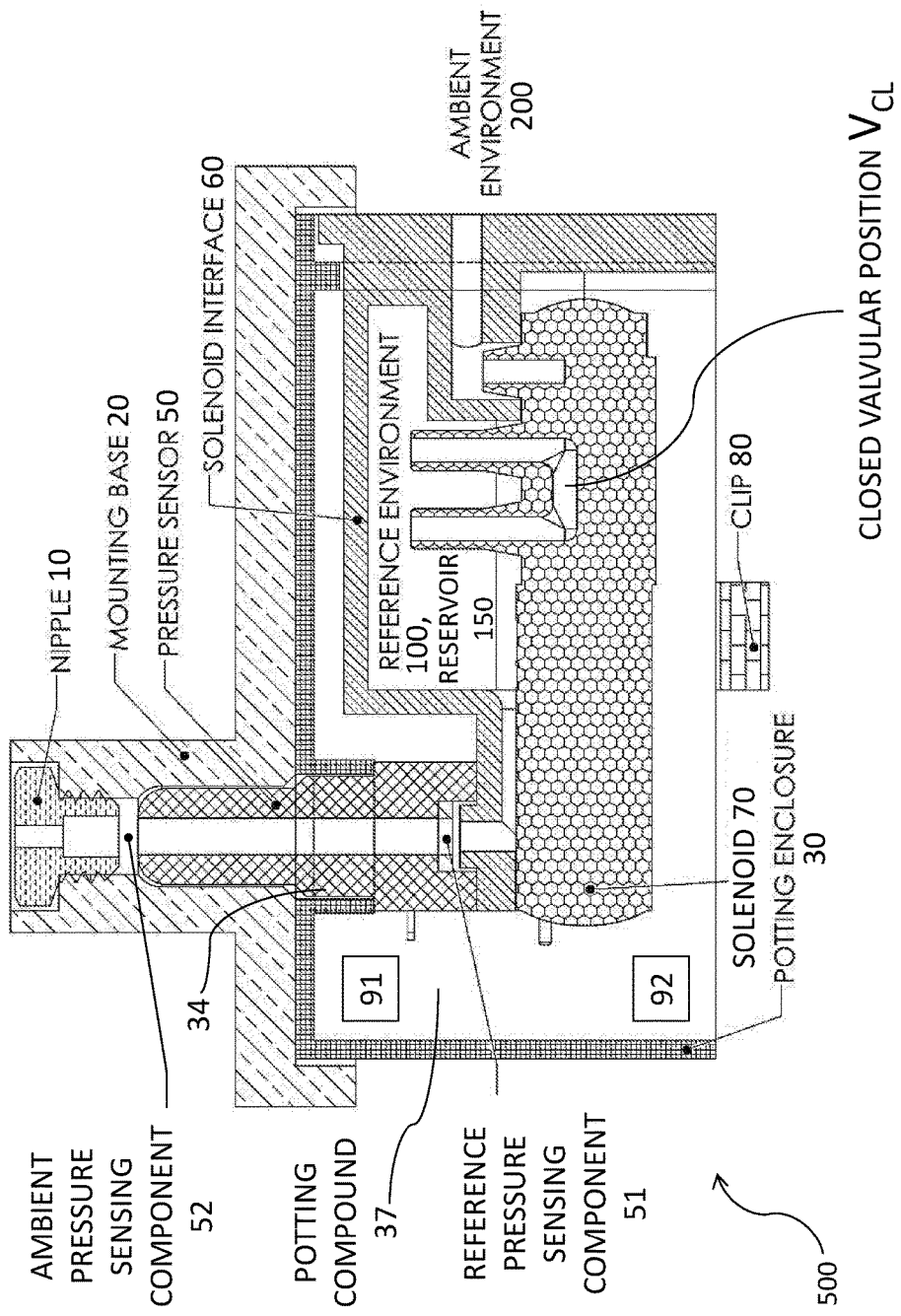
FIG. 2 is a side elevation view of the inventive embodiment shown in FIG. 1, wherein the solenoid valve is closed.
Figure 3:
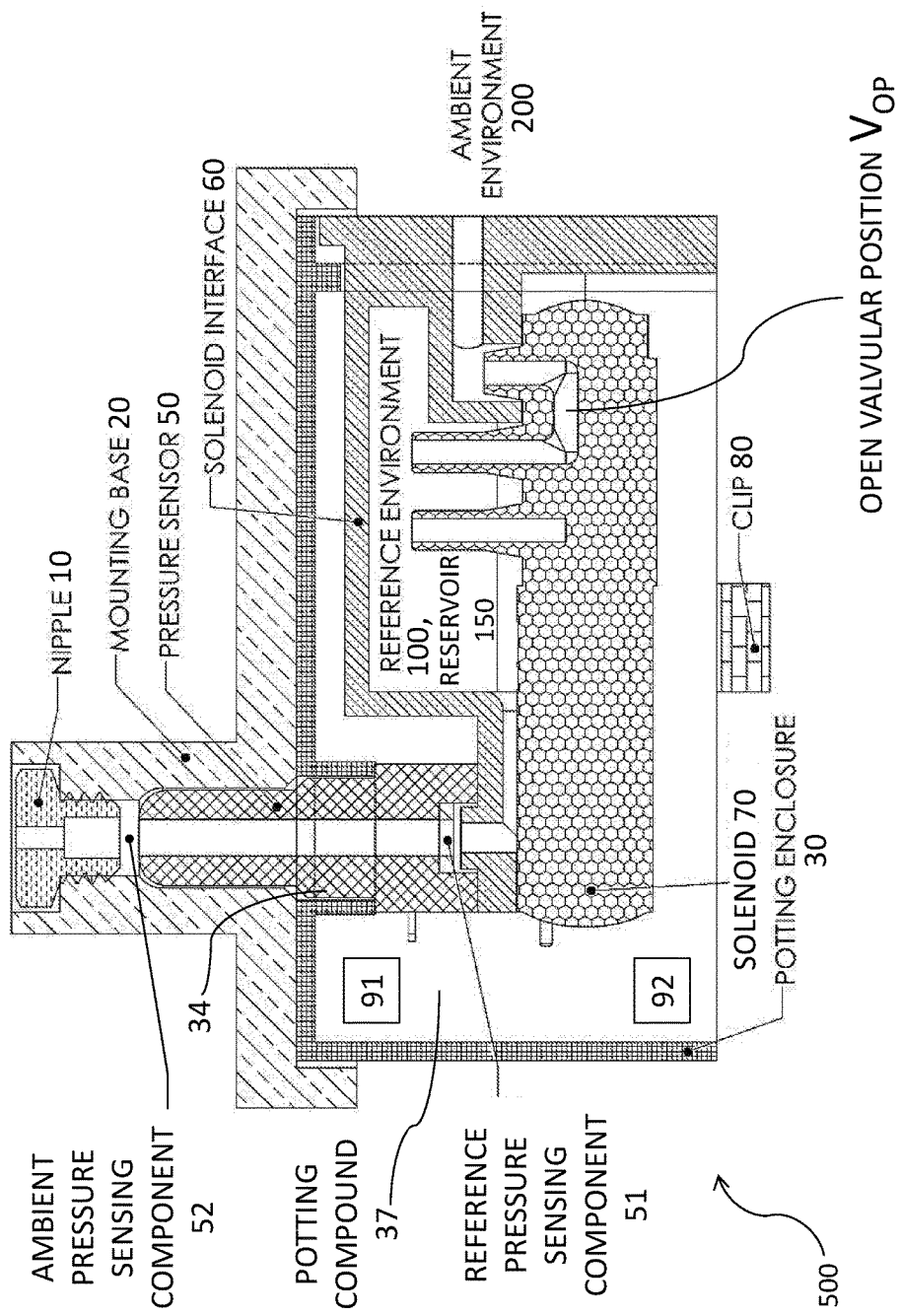
FIG. 3 is a side elevation view (similar to the view of FIG. 2) of the inventive embodiment shown in FIG. 1, wherein the solenoid valve is open.

Potting enclosure 30 is the "box" containing the main parts, viz., electrical conductor 40, pressure sensor 50, solenoid interface 60, and solenoid valve 70. As shown in FIGS. 1 through 3, potting enclosure 30 is characterized by an opening 34, through which pressure sensor 50 projects. Pressure sensor 50 includes reference pressure sensor component 51 and ambient pressure sensor component 52. Ambient pressure sensor component 52, situate outside potting enclosure 30, is for sensing, ambient environment 200. Reference pressure sensor 51, situate inside potting enclosure 30, is for sensing reference environment 100. According to some inventive embodiments, potting enclosure 30 also contains a computer 92 and an AC or DC power supply (e.g., battery) 91. Once the parts are assembled within enclosure 30, a liquid plastic (commonly referred to as "potting") 37 is poured into enclosure 30. When the potting 37 is dried, the parts are effectively sealed up and the inventive device 500 is waterproof. The potting compound 37 is poured within potting enclosure 30 to ensure an airtight seal of the internal parts/components from the environment. In addition, enclosure 30 serves as the exterior shape of the assembly that fits between mounting base 20 and retaining clip 80. Pressure gauge 50 is then calibrated and the inventive system is ready to use.

Figure 4:
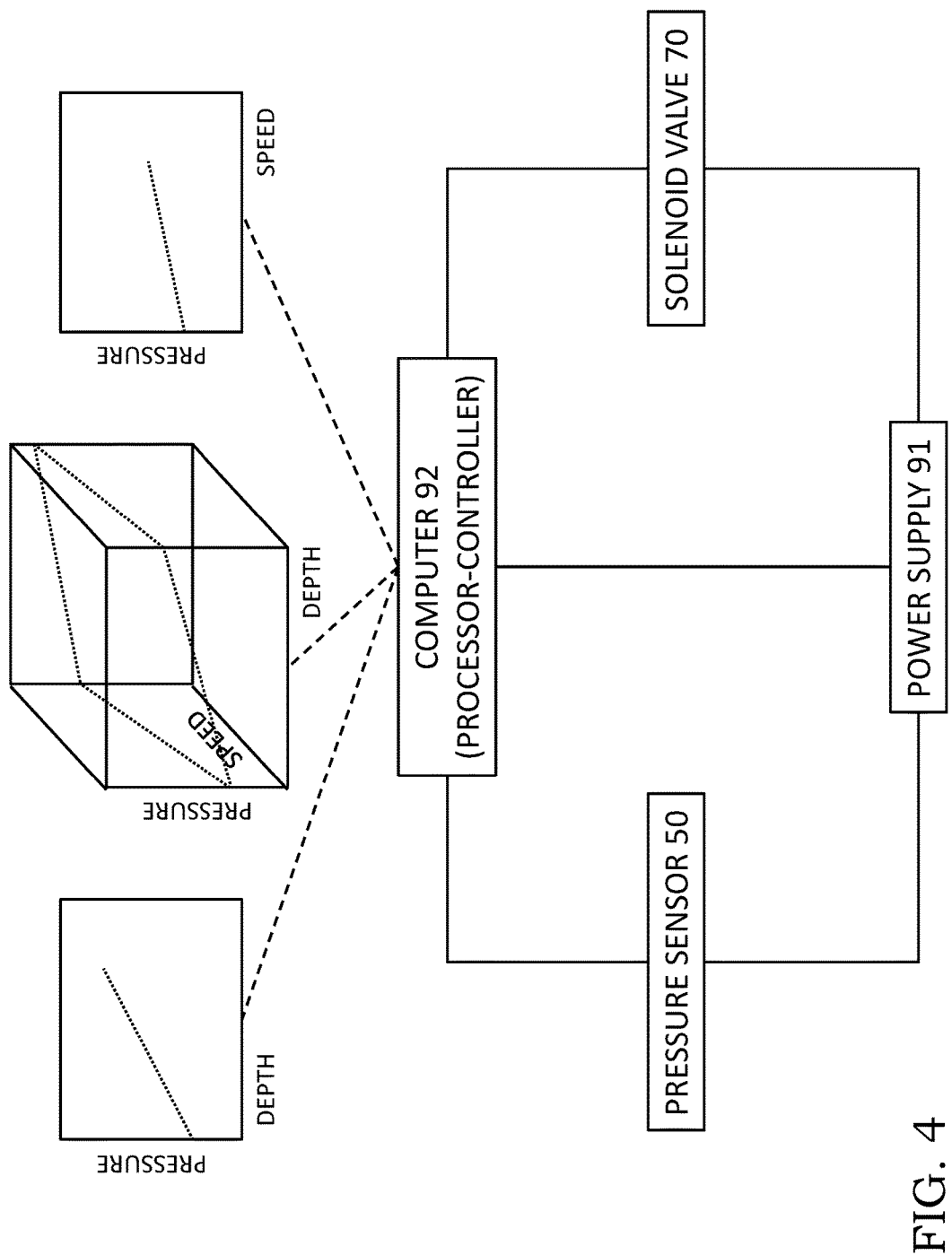
FIG. 4 is a schematic of an example of an inventive differential pressure measurement system including computer control and data acquisition.

Electrical conductor 40, e.g., a cable or a metal wire, connects pressure sensor 50 and solenoid valve 70 to power supply (e.g., battery) 91 and to computer 92, such as schematically shown in FIG. 4. Pressure sensor 50 transmits sensor data signals to computer 92 for data acquisition/processing, and computer 92 controls the opening and closing of solenoid valve 70. For instance, in inventive embodiments involving moving underwater vessels, pressure readings can be processed and displayed with respect to varying locations (e.g., water depths) and/or varying vessel speeds.

The central element of the data collection that inventive device 1000 effects is differential pressure sensor 50, which measures the differential pressure between reference environment 100 and ambient environment 200. Differential pressure sensor 50 includes reference pressure component 51 and ambient pressure component 52. The inventive prototype implemented a Honeywell ±0.5 psi differential pressure gauge 50, manufactured by Honeywell International Inc., offices at 101 Columbia Road, P.O. Box 4000, Morristown, N.J. 07962.

Solenoid interface 60 is the structure that houses pressure sensor 50 and solenoid valve 70. Pressure sensor 50, solenoid interface 60, and solenoid valve 70, when assembled together, delimit the internal reference reservoir 150, which contains the reference environment 100 fluid. Reservoir 150 is bounded by respective surfaces of differential pressure sensor 50, interface 60, and solenoid valve 70. Reference pressure component 51 is the section of pressure sensor 50 that borders upon reservoir 150.

Ambient pressure sensor component 52, located at or near nipple 10, measures the current pressure of the ambient environment 200. Reference pressure sensor component 51, located at or near reference reservoir 150, measures the initial pressure of the ambient environment 200 fluid, i.e., the pressure to which reference environment 100 has been originally equated and thereafter maintained for the duration of the series of pressure measurements taken by inventive device 100.

At the beginning of the pressure measurement sequence, solenoid valve 70 is opened for a sufficient period of time to equalize the pressure inside the reference reservoir 150 to that of the ambient environment 20; solenoid valve 70 is then closed to maintain this constant pressure inside reference reservoir 150. The inventive prototype implemented a Lee LHD mini solenoid valve 70, manufactured by The Lee Company, offices at 2 Pettipaug Road, P.O. Box 424, Westbrook, Conn. 06498-0424.

The opening and closing of solenoid valve 70 thus serves two respective purposes. When solenoid valve 70 is initially open (valvular position $V_{OP}$, shown in FIG. 3), it allows reference environment 100 to equalize with respect to ambient environment 200, i.e., to match the pressure of the ambient environment 200 as initially exists. When solenoid valve 70 is subsequently closed (valvular position $V_{CL}$, shown in FIG. 2), it isolates reference environment 100 so as to maintain this pressure in a steady state equaling the pressure of the initial ambient environment 200. The pressure of reference environment 100 is thus held constant, thereby ensuring the accuracy of the measurements taken by pressure sensor (e.g., pressure gauge) 50.

Note that nipple 10, mounting base 20, and retaining clip 80 as shown in FIGS. 1 through 3 are specific to the type of testing for which this inventive embodiment was designed. Depending on the embodiment or application of the present invention, one or some of the parts and components shown in FIG. 1 may be unnecessary in order for the inventive system to work properly.

Pressure sensor 50 measures the relative difference in pressure between reference environment 100 and ambient environment 200, which is the environment at the location of nipple 10. The main function of solenoid valve 70 is to open and close the pathway between the ambient environment 200 and the reference environment 100. Solenoid valve 70 is initially closed; reference environment 100 and ambient environment 200 thus differ in pressure. Solenoid valve 70 is subsequently opened; reference environment 100 and ambient environment 200 thus tend toward and eventually reach equivalency in pressure. The opening of solenoid valve 70 allows a free pathway between reference environment 100 and ambient environment 200. Once the ambient environment 200 and the reference environment 100 are the same, the valve 70 is closed again, thereby isolating the reference environment 100 and preventing it from changing while the pressure in the ambient environment 200 at the nipple 10 is being measured.

Exemplary inventive practice maintains constancy of the reference pressure, and thus succeeds in accurately measuring the relative pressure of ambient environment 200 in the vicinity of nipple 10. The differential pressure is taken between the current ambient pressure (as currently existing in ambient environment 200 at nipple 10) and the initial ambient pressure (as initially existing in ambient environment 200, e.g., at a separate location from nipple 10). The initial ambient pressure is set at an unvarying reference pressure. Accordingly, the ambient pressure measurements subsequently taken in the vicinity of nipple 10 are meaningful by virtue of their comparison with the unvarying reference pressure.

If pressure measurements were taken by a differential pressure sensor whereby both pressure sensing components were sensing pressure in the same ambient environment, such measurements would be meaningless for purposes of determining a differential pressure, as both ambient pressure measurements would change in similar fashion. The ambient pressure at a first location could not be used as the reference pressure during repeated measurements of the ambient pressure at a second location, as the ambient pressure at the first location would be constantly changing in relation to the "original" ambient pressure at the first location. Measurements of the ambient reference environment at the first location would vary similarly as measurements of the ambient environment at the second location would vary.

The present inventor considered the choice of fluid to be used within the reservoir in order to achieve the best results. After extensive testing of an inventive prototype it was determined that an effective approach was to leave air in the reservoir. This approach not only eased assembly of the exemplary inventive device, but also demonstrated an ability to equalize and hold a reference pressure as well as water, of which is the ambient environment was composed. There was also concern that because the air-water interface at the solenoid was open, water would be able to enter the reservoir and affect the stability of the reference pressure. Testing of this water infiltration question demonstrated that, while some water does enter the reservoir over time, the water does not significantly affect the quality of the data.

The inventive prototype met all of the requirements needed for the model testing conducted by the U.S. Navy. Inventive practice shows great commercial promise to fill a gap in the current pressure measurement market. The inventive prototype was capable of equalizing and then isolating the reference reservoir from the environment, and of measuring a ±0.14 psi range with great accuracy (within 0.5% accuracy). Furthermore, the inventive prototype had a very small packaged volume (dimensions of 0.875"×0.75"×2"), and implemented a ±0.5 psi differential pressure gauge.

Inventive practice can implement pressure gauges having a variety of ranges, including ±1 psi, ±5 psi, all the way up to ±250 psi. The present invention can be practiced to measure pressures in fluids other than water, such as air or oil. Inventive practice is thus versatile and capable of being practiced for multifarious. As compared with inventive practice, no pressure measurement device that is commercially available is capable of measuring such a wide range of pressures in a variety of fluids and with such a small form factor.

The present invention, which is disclosed herein, is not to be limited by the embodiments described or illustrated herein, which are given by way of example and not of limitation. Other embodiments of the present invention will be apparent to those skilled in the art from a consideration of the instant disclosure, or from practice of the present invention. Various omissions, modifications, and changes to the principles disclosed herein may be made by one skilled in the art without departing from the true scope and spirit of the present invention, which is indicated by the following claims.

What is claimed is:
1. A pressure measurement method comprising:
making an assembly including a potting enclosure, a potting compound, a differential pressure sensor, a solenoid interface, and a solenoid valve, said making of said assembly including introducing said potting compound inside said potting enclosure, wherein:
said potting compound acts as a sealant for said differential pressure sensor, said solenoid interface, and said solenoid valve contained in said potting enclosure:
a first component of said differential pressure sensor is situate inside said potting enclosure for sensing an equalized first pressure;
a second component of said differential pressure sensor is situate outside said potting enclosure for sensing a second pressure;
said potting enclosure has an opening through which said differential pressure sensor passes, thereby facilitating said situation of said second component outside said potting enclosure;
said differential pressure sensor, said solenoid interface, and said solenoid valve delimit a first fluidic environment, said first fluidic environment being internal to said potting enclosure;
equalizing said first pressure with respect to said second pressure, and measuring a differential pressure between the equalized said first pressure and said second pressure, wherein:
said first pressure characterizes said first fluidic environment;
said second pressure characterizes a second fluidic environment, said second fluidic environment being external to said potting enclosure;
said equalizing of said first pressure includes enabling fluidic passage between said first fluidic environment and said second fluidic environment until said first pressure and said second pressure are equal, and then disenabling said fluidic passage between said first fluidic environment and said second fluidic environment so that the equalized said first pressure remains constant.

2. The pressure measurement method of claim 1, wherein said solenoid valve is used to enable said fluidic passage and to disenable said fluidic passage.

3. The pressure measurement method of claim 1 wherein said second fluidic environment is a water environment, and wherein the pressure measurement method further comprises:
using a device for said equalizing of said first pressure with respect to said second pressure and for said measuring of said differential pressure;
associating said device with an underwater vessel.

4. The pressure measurement method of claim 3 wherein said measuring of said differential pressure is performed plural times at plural locations of said underwater vessel in said water environment.

5. The pressure measurement method of claim 4 wherein said measuring of said differential is performed at plural speeds of said underwater vessel in said water environment.

6. The pressure measurement method of claim 5, further comprising computer-processing signals indicative of said measurements of said differential pressure.

7. The pressure measurement method of claim 6, wherein said solenoid valve is used to enable said fluidic passage and to disenable said fluidic passage.

8. A method for measuring pressure upon an object, the method comprising:
associating a pressure measurement device with an object, said pressure measurement device including a potting enclosure, a potting compound, a differential pressure sensor, an interface, a reservoir, and a valve, said differential pressure sensor including a first pressure sensing component and a second pressure sensing component, wherein: said potting compound seals said differential pressure sensor, said interface, said reservoir, and said valve inside said potting enclosure; said potting enclosure has an opening; said differential pressure sensor passes through said opening so that a portion of said differential pressure sensor is outside said potting enclosure: respective surfaces of said differential pressure sensor said interface and said valve define said, reservoir; said first pressure sensing component is located outside said potting enclosure; said second pressure sensing component is located inside said potting enclosure;
placing said object having said pressure measurement device associated therewith in an ambience, said reservoir characterized by a reservoir pressure, said ambience characterized by an ambience pressure;
equalizing said reservoir pressure with respect to said ambience pressure, said equalizing including setting said valve to open a passageway between said reservoir and said ambience, and resetting said valve to close said passageway between said reservoir and said ambience, wherein said closure of said passageway results in constancy of the equalized said reservoir pressure;
measuring a differential between the ambience pressure and the constant equalized said reservoir pressure, wherein said measuring of said differential includes using said first pressure sensing component being for measuring said ambient pressure and using said second pressure sensing component for measuring the constant equalized said reservoir pressure.

9. The method for measuring pressure as recited in claim 8, further comprising using a computer for receiving and processing measurement signals transmitted by said differential pressure sensor.

10. The method for measuring pressure as recited in claim 8, wherein:
said object is an underwater vessel;
said ambience is an underwater ambience;
said placing of said underwater vessel in said underwater ambience includes submerging said underwater vessel in said underwater ambience.

11. The method for measuring pressure as recited in claim 10, further comprising using a computer for receiving and processing measurement signals transmitted by said differential pressure sensor.

12. The method for measuring pressure as recited in claim 10, wherein said measuring of said differential is performed plural times at plural locations of said underwater vessel in said underwater ambience.

13. The method for measuring pressure as recited in claim 12, wherein said measuring of said differential is performed plural times at plural speeds of said underwater vessel in said underwater ambience.

14. A pressure measurement device comprising:
a differential pressure sensor including a first pressure sensing component and a second pressure sensing component, said first pressure sensing component for measuring an ambient pressure, said second pressure sensing component for measuring a reference pressure, said ambient pressure characterizing an ambient environmental fluid, said reference pressure characterizing a reference environmental fluid;
a reservoir for containing said reference environmental fluid, said reservoir having a first reservoir aperture and a second reservoir aperture, said first reservoir aperture communicating with said second pressure sensing component, said second reservoir aperture communicating with said ambient environmental fluid;
a solenoid valve for opening and closing said second reservoir aperture, wherein said solenoid valve in an open position permits free passage through said second reservoir aperture between said reference environmental fluid and said ambient environmental fluid, thereby equalizing said reference pressure of said reference environmental fluid with respect to said ambient pressure of said ambient environmental fluid, and wherein said solenoid valve in a subsequently closed position stabilizes the equalized said reference pressure of said reference environmental fluid inside said reservoir;
an interface member for joining said differential pressure sensor and said solenoid valve;
an enclosure for enclosing said differential pressure sensor, said interface member and said solenoid valve, said enclosure characterized by an opening:
a potting material, inside said enclosure, for sealing said differential pressure sensor, said solenoid valve, and said interface member, wherein: said reservoir is delimited by respective surfaces of said differential pressure sensor, said interface member, and said solenoid valve; said differential pressure sensor projects outside said enclosure through said opening; said first pressure sensing component is situate outside said enclosure; said second pressure sensing component is situate inside said enclosure.

15. The pressure measurement device of claim 14 further comprising a computer for receiving and processing measurement signals transmitted by said differential pressure sensor.

16. The pressure measurement device of claim 14 further comprising a computer for receiving and processing measurement signals transmitted by said differential pressure sensor, wherein said differential pressure sensor, said solenoid valve, said interface member, and said computer are enclosed in said enclosure and are sealed by said potting material.

* * * * *